April 1, 1969 R. E. BARBATO ET AL 3,436,488
LINE CIRCUIT FOR A KEY TELEPHONE SYSTEM UTILIZING
A SINGLE MULTIFUNCTION SUPERVISORY RELAY
Filed March 17, 1966
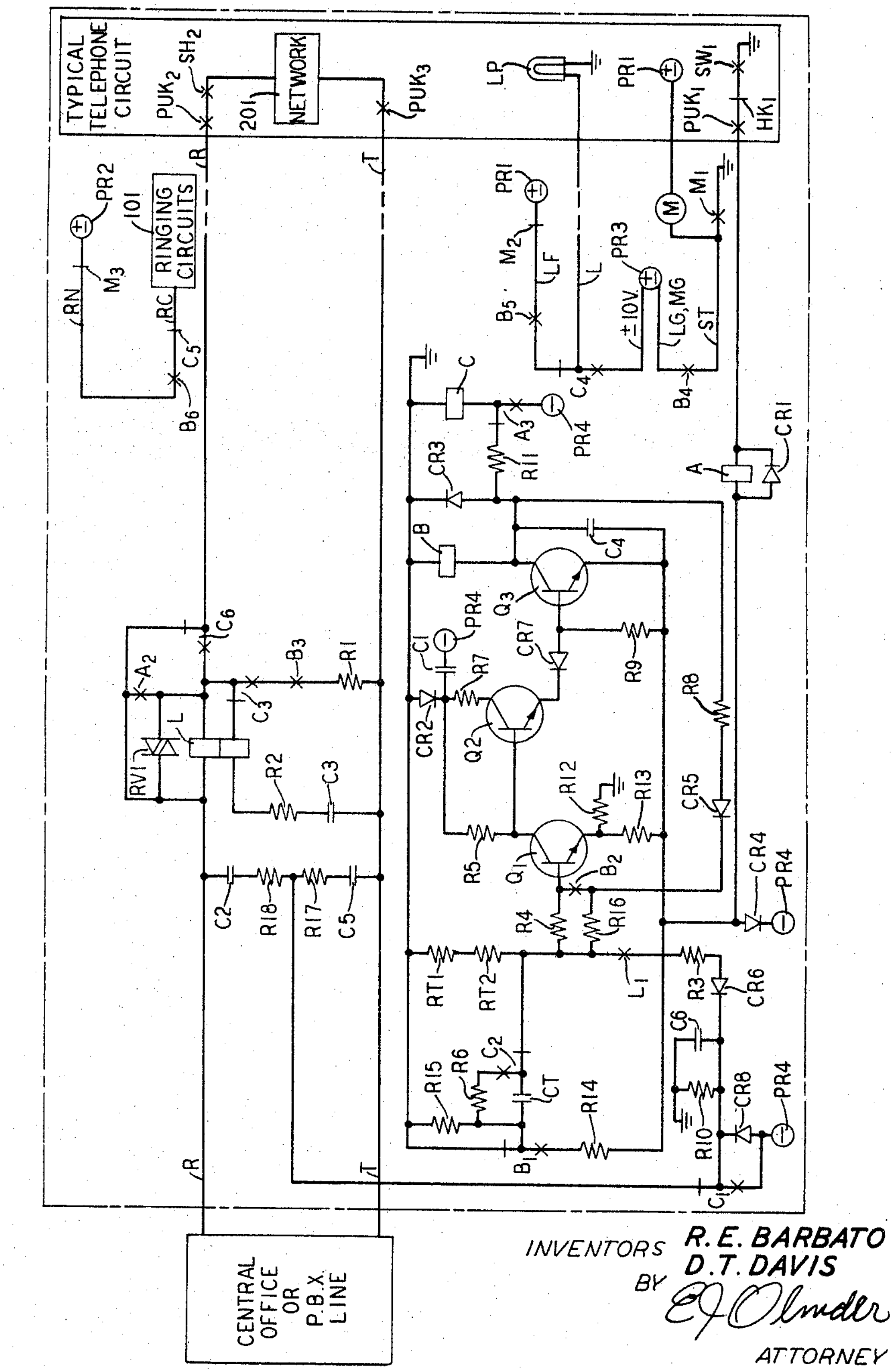
INVENTORS R. E. BARBATO
D. T. DAVIS
BY E J Olnder
ATTORNEY 3,436,488

LINE CIRCUIT FOR A KEY TELEPHONE SYSTEM UTILIZING A SINGLE MULTIFUNCTION SUPERVISORY RELAY

Robert E. Barbato, Middletown, and David T. Davis, East Brunswick, N.J., assignors to Bell Telephone Laboratories, Incorporated, New York, N.Y., a corporation of New York Filed Mar. 17, 1966, Ser. No. 535,162
Int. Cl. H04m 1/21
U.S. Cl. 179—99 8 Claims

ABSTRACT OF THE DISCLOSURE

A single relay employed for line circuit supervision is responsive to polarity reversal or line current interruption from the central office in order to release a held line. The same relay detects ringing current and controls the holding function. Three transistors are employed in the circuit.

This invention relates to telephone line circuits and more particularly to line circuits of the type utilized in key telephone systems.

A telephone line circuit is a basic part of a telephone network in that it provides the necessary interface between a subscriber's set and the switching equipment at central switching points such as PBX's or central offices. More specifically, a telephone line circuit performs those supervisory and control functions that are incident to the establishment of a connection between a central switching point and one or more local subscribers' telephone sets. These functions typically involve signaling a particular subscriber's station in response to the detection of a ringing signal from the central office or PBX switching point. In some instances, the ringing signal from the switching point may be utilized directly to operate a local ringer at the subscriber's station. In other arrangements, the received ringing signal may be detected by a ringing detector arrangement in the line circuit which in turn extends ringing current from a local source to the ringer. The latter arrangement may be employed, for example, in key telephone systems wherein there is a need for signaling a number of subsets in response to an incoming call. Combinations of these two types of line circuit arrangements are also known in the prior art.

Other functions performed by prior art line circuits relate to line holding arrangements. In a key telephone system, for example, it may be desirable to hold one line, keeping the line in an inactive but waiting condition, while actually transmitting and receiving on a second line. Means must be provided for manual release of a line from its hold condition as well as means responsive to central office control that will also release the held line.

With the number of diverse tasks required of telephone line circuits, it is apparent that some degree of complexity is inherent. Complexity, however, necessarily limits reliability and increases cost.

Accordingly, a general object of the invention is to reduce the complexity of telephone line circuits. Related objects include enhancement of line circuit reliability and reduction in cost.

These and other objects are achieved in accordance with the principles of the invention in one illustrative embodiment wherein a line circuit for a key telephone system realizes a multifunction utilization of a single relay in the performance of diverse line circuit services. Specifically, a single relay is employed for line circuit supervision and is responsive to a simple polarity reversal applied from the central switching point for the purpose of releasing a held line. Alternatively, the same relay may effect the release of a held line in response to a brief interruption in line current at the central office. The same relay is also employed to detect ringing current and additionally provides the necessary line supervision to implement the holding function.

One feature of the invention, therefore, is the use of a single relay to perform the several functions indicated.

Another feature pertains to a uniquely simple circuit arrangement for releasing a held line in response either to a polarity reversal on the line or to an interruption in line current.

An additional feature relates to a functionally symmetric detector circuit which provides the detecting function in substantially the same manner irrespective of the side of the line that is grounded at the central office when ringing voltage is applied.

A further feature of the invention involves a circuit means for maintaining a constant time-out interval before the ringup portion of a line circuit is released after the termination of ringing if the call remains unanswered. The time-out period remains constant irrespective of the duration of the ringing bursts and accordingly, ensures consistent circuit operation irrespective of variations that may occur in the characteristics of the ringing current.

The principles of the invention as well as additional objects and features thereof will be fully apprehended from the following detailed description of an illustrative embodiment and from the drawing in which the single figure is a schematic circuit diagram of a line circuit in accordance with the invention.

A description of the circuit shown in the drawing may best be presented in terms of its operation during each significant operating phase or mode.

*Circuit response to incoming ringing signal*

When the circuit shown in the single figure of the drawing is in the idle condition, each of the relays A, B, C and L are in the unoperated state and transistors Q2 and Q3 are nonconducting or off. Transistor Q1 is held in a conducting or on condition by current supplied to its base through the resistor network formed by resistors RT1, RT2, R4, R8, R16, R11 and the B and C relay coils.

Operation of the line circuit is initiated by the application of ringing voltage across the leads T and R at the central office or other central switching point. Ringing voltage is normally applied across the line with the tip side grounded, although, in accordance with a feature of the invention, the ringing current detection circuit is substantially symmetrical so that the circuit will also function normally with the ring side of the line grounded at the central office. When ringing voltage is applied as described, ringing current flows through the series connected primary and secondary windings of relay L, resistor R2 and capacitor C3, thereby causing relay L to operate on each half cycle of ringing current.

Ringing current also flows through capacitor C2 and resistor R18 to the cathode terminal of Zener diode CR8. The negative side of capacitor CT is normally maintained at about —16 volts. Specific levels of voltage and current noted herein are merely illustrative and are in no sense intended as limitations on the scope of the invention. Negative half cycles of ringing cause diode CR8 to conduct in the forward direction so that the cathode terminal of diode CR6 is fixed at about —24.5 volts. Diode CR6 is thus forward biased when contact $L_1$ is closed and the negative side of capacitor CT is charged toward —24 volts over a path that includes resistor R3.

Positive cycles of ringing cause diode CR8 to break down so that the cathode side of diode CR6 is at about zero volts. The negative side of capacitor CT is at this point somewhere between —16 and —18 volts so that diode CR6 is reverse biased and capacitor CT does not charge. Instead, however, capacitor CT discharges through the resistor network formed by resistors RT1, RT2, R8, R11, R16 and the B and C relay coils. The charge lost by capacitor CT during this interval is much less than that gained during the negative half cycle. After a predetermined fixed time interval which may be on the order of 0.5 second for example, a sufficient number of cycles of ringing will have charged capacitor CT to a level of about —18 volts, the base potential of transistor Q1, and, accordingly, transistor Q1 turns off. As indicated above, operation with the ring side grounded is substantially the same, owing to the symmetry of the detector circuit, although with the ring side grounded, ringing current flows to the cathode side of diode CR8 through capacitor C5 and resistor R17.

When transistor Q1 turns off, as described above, its collector voltage rises and transistor Q2 turns on. Zener diode CR7, connecting the emitter of transistor Q2 to the base of transistor Q3, breaks down and transistor Q3 turns on, supplying current in the collector circuit to operate relay B. Relay C does not operate at this time inasmuch as resistor R11 limits the current through its winding to less than its operate value. Relay B operated connects ground to the ST or start lead by way of make contact $B_4$ to start the operation of motor M, a motor typically common to groups of line circuits of the type shown. Motor M effects the operation of cam-controlled interrupter contacts $M_2$ and $M_3$ and also closes a cam-operated make contact $M_1$ to ensure continued motor operation. Indicator lamp LP, a lamp conventionally mounted in the telephone set (not shown) for signaling a busy line, is lighted by current from the source PR1 by way of lead LF, make contact $B_5$, unoperated break contact $C_4$ and lead L. Lamp flashing is effected by the operation of interrupter contact $M_2$. Additionally, the operation of relay B extends interrupted ringing current from source PR2 to the ringing circuits 101 for audible signal control by way of lead RC, make contact $B_6$ and unoperated break contact $C_5$. Ringing current is interrupted by the repeated operation of break contact $M_3$. Convenional wiring options, not shown, may be provided so that steady ringing current may be offered as an alternative; or, a ground connection may be made available to operate buzzers or other types of audible indicators. Transistor Q1 remains off and transistors Q2 and Q3 remain on until the call is either answered or timed out after ringing from the central switching point is removed.

*Time-out action of ringup circuit*

At the instant that transistor Q1 turns off, the voltage on the negative side of capacitor CT is about —18 volts. When the B relay operates, the voltage divider formed by resistors R14 and R15 is switched into the circuit, and the voltage on the positive side of capacitor CT drops from zero volts to about —6 volts. Consequently, the negative side of capacitor CT drops from —18 to approximately —24 volts. On subsequent positive half cycles of ringing current, diode CR6 is reverse biased as before. Operation of relay B causes the anode terminal of diode CR5 to be connected back to —24 volts through resistor R8, transistor Q3 and diode CR4. The cathode terminal of diode CR5 is connected to the base of transistor Q1 which is held at about —24 volts while ringing is being applied. During the silent interval of ringing, the voltage at the base of transistor Q1 is between about —24 volts and —18 volts. Accordingly, diode CR5 does not conduct. The discharge path for capacitor CT at this time is thus only through resistors RT1 and RT2 to ground. On negative half cycles of ringing current, diode CR6 conducts slightly to restore the charge lost by capacitor CT during the previous positive half cycle. It is in this way, in accordance with the invention, that the charge on capacitor CT, which determines the duration of the time-out period, is held substantially consant once the circuit has operated irrespective of the duration of the ringing bursts.

Upon the termination of any burst of ringing current, the negative side of capacitor CT begins to charge toward ground through resistors RT1 and RT2. Transistor Q1 remains off until the voltage on the negative side of capacitor CT reaches approximately —18 volts, at which time transistor Q1 turns on and its collector voltage drops. This causes transistor Q2, diode CR7 and transistor Q3 to turn off and relay B to release, thus returning the circuit to its idle condition. A typical time that is required for the B relay to release after the completion of a burst of ringing may be on the order of 35 seconds. With various wiring options this time may be varied substantially by eliminating resistor RT1 or by shunting resistor RT1 by an appropriately selected external resistor placed across terminals specifically provided therefore.

*Answering an incoming call—busy state*

An incoming call is answered by operating the conventional pickup key, not shown, associated with the line being rung and moving the receiver to the off-hook condition. The station or telephone network proper 201 is then connected across the line by way of pickup contacts $PUK_2$ and $PUK_3$ and switch hook contact $SH_2$. Ringing is tripped at the central office in the normal manner. Ground is also connected through switch hook contact SW1 and pickup contact $PUK_1$ to the A lead thus operating relay A which by its make contact $A_2$ shunts the upper or primary winding of relay L, preventing relay L from operating on line current. Relay C operates over make contact $A_3$. Break contact $C_2$ disconnects the negative side of capacitor CT from the base circuit of transistor Q1 and make contact $C_2$ connects resistor R6 across capacitor CT causing it to discharge. Transistor Q1 turns on immediately, causing transistors Q2 and Q3 to turn off and release relay B. Relay C also removes the center tap of the ringup bridge from the rest of the circuit by opening the tap at break contact $C_1$, thereby preventing the introduction of noise into the talking path. The lower winding or secondary of relay L is disconnected by break contact $C_3$, thus eliminating the shunting effect on the line of the secondary winding in series with resistor R2 and capacitor C3. Relays A and C operated, establish the talking path over make contacts $A_2$ and $C_6$, and connect lamp LP to a steady source of power PR3 by way of make contact $C_4$. Lead RC is opened at break contact $C_6$ to discontinue local audible signaling.

The procedure for making an outgoing call is the same as that for answering an incoming call except that transistors Q2 and Q3 are normally off and relay B is released.

*Holding function*

A busy line can be placed in a hold condition by operating the conventional hold key, not shown, on the telephone set. When the hold key is depressed, operating break contact $HK_1$, ground is disconnected from the A lead causing relay A to release. Make contact $A_2$, shunting the primary of relay L, opens and inasmuch as the station has not at this point been disconnected from the line, relay L operates on line current. Operation of relay L and its make contact $L_1$ causes the base circuit of transistor Q1 to be connected through resistor R3, diode CR6 and the operated make contact $C_1$ to a —24 volt power supply PR4. The voltage at the junction point of resistor R16 and make contact $L_1$ drops to approximately —24 volts, causing transistor Q1 to turn off and transistors Q2 and Q3 to turn on. Transistor Q3 turns on approximately two milliseconds after relay A releases, and a holding path is thereby provided for relay C by way of resistor R11, transistor Q3 and diode CR4 to power supply PR4. Finally, relay B operates over the emitter-collector path of transistor Q3. Relays B and C operated, connect the hold resistor R1 in series with the primary winding of relay L and across the line by way of make contacts $B_3$ and $C_3$, connect leads LG and ST by way of make contact $B_4$ and connect signal lamp LP to power source PR1 by way of make contact $C_4$ and break contact $A_4$. When the hold key is released, the station is disconnected from the line, and current through relay L and resistor R1 maintains the circuit in the hold state.

*Release of the holding bridge by a station*

Any station of the key telephone system that seizes the line by operating the associated pickup key and going off-hook will cause relay A to operate in the manner described, and shunt the primary winding of relay L which then releases. Transistor Q1 then turns on and transistors Q2 and Q3 turn off, releasing relay B. Relay C is held operated by relay A over make contact $A_3$. The circuit is thus restored to the busy state.

*Release of the holding bridge from the central office or PBX by an open circuit line*

In the event that a held party abandons his call, the line circuit can be released from the connecting switching equipment by providing a momentary interruption of line current. This causes relay L to release. Transistor Q1 therefore turns on, transistors Q2 and Q3 turn off and relays B and C release, restoring the circuit to its idle state.

*Release of the holding bridge from the central office or PBX by a battery reversal*

In accordance with the invention, an abandoned held line may be released not only in response to an interruption at the central office of the current on the line but also by a reversal in the polarity of the line current. Reversal of line current by the connecting central switching equipment causes relay L to release and then immediately to re-operate. When relay L releases, transistor Q1 turns on, transistors Q2 and Q3 turn off and relays B and C begin to release. The voltage at the collector of transistor Q3 rises to approximately zero volts and diode CR5 conducts, providing current to the base of transistor Q1 through resistor R8. After about 2 milliseconds, relay L re-operates and current is diverted from the base of transistor Q1 through resistor R4, make contact $L_1$, resistor R3, diode CR6 and make contact $C_1$ to power supply PR4. At this point there is still sufficient current supplied through resistor R8 to keep transistor Q1 on so that transistors Q2 and Q3 remain off and relays B and C therefore ultimately release, restoring the circuit to its idle state.

*Disconnection*

When all of the stations in a system in accordance with the invention go on-hook, the A lead is disconnected from ground causing relay A to release. The release of relay A opens the holding path for relay C at make contact $A_3$ and relay C releases. In this way the circuit is restored to its idle state.

*Operation with local power failure*

During periods when the local D-C supply is inoperative it is still possible to originate outgoing calls. When the station goes off-hook, connection to the line is metallic. The primary and secondary windings of relay L are connected in series with resistor R2 and capacitor C3 across the line but this path has a negligible effect on the talking circuit. Incoming calls are signaled by line ringers in the conventional manner although visual and common audible signals are inoperative.

It is to be understood that the embodiment described herein is merely illustrative of the principles of the invention. A variety of modifications thereto may be effected by persons skilled in the art without departing from the spirit and scope of the invention.

What is claimed is:

1. A telephone line circuit for a key telephone system comprising, in combination, a first pair of line conductors, means including a relay for placing said first pair of line conductors in a hold condition, means including said relay responsive to a polarity reversal across said conductors for releasing said conductors from said hold condition, and means including said relay for detecting ringing current applied to said conductors.

2. A telephone line circuit for a key telephone system comprising, in combination, a first pair of line conductors, means including a relay for placing said first pair of line conductors in a hold condition, means including said relay responsive either to a polarity reversal across said conductors or to an interruption in current flow in said conductors for releasing said conductors from said hold condition, and means including said relay for detecting ringing current applied to said conductors.

3. Apparatus in accordance with claim 2 including means responsive to the application of successive bursts of ringing voltage across said conductors followed by a relatively prolonged absence of said ringing voltage for effecting a time-out action on said circuit at a fixed time after the cessation of said ringing voltage said time being independent of the duration of said bursts of ringing voltage.

4. Apparatus in accordance with claim 3 wherein said means for effecting a time-out action includes a capacitive element that is partially discharged on each half cycle of ringing current of a given polarity and that is fully charged on each successive half cycle of ringing current of an opposite polarity whereby said element remains substantially fully charged irrespective of the duration of successive bursts of said ringing current.

5. A telephone line circuit for a key telephone system comprising, in combination, a first pair of line conductors, means including a relay for placing said first pair of line conductors in a hold condition, means including said relay responsive to a polarity reversal across said conductors for releasing said conductors from said hold condition, means including said relay for detecting ringing current applied to said conductors irrespective of which of said conductors is grounded, and means for utilizing said ringing current to effect common ringing control.

6. A telephone line circuit for a key telephone system comprising, in combination, a first relay operatively responsive to alternate half cycles of ringing current, means including contacts of said first relay for turning off a first transistor after a preselected duration of said ringing current, means responsive to the turn-off of said first transistor for placing second and third transistors in a conducting state, a second relay operatively responsive to said second and third transistors being placed in a conducting state, means responsive to the operation of said second relay for lighting an indicator lamp and for extending said ringing current for centralized ringing control, and means operative a preselected time after the termination of said ringing current for returning said line circuit to an idle condition, said preselected time remaining constant irrespective of the duraton of individual bursts of said ringing current.

7. Apparatus in accordance with claim 6 wherein said returning means includes an R-C timing circuit.

8. A telephone line circuit comprising, in combination, a first pair of line conductors, means including a relay for placing said first pair of line conductors in a hold condition, means including said relay responsive to either a polarity reversal across said conductors or to an interruption in line current or said conductors for releasing said conductors from said hold condition, means including said relay for detecting ringing current applied to said conductors irrespective of which of said conductors is grounded, and means for timing-out said circuit and returning said circuit to an idle condition upon the termination of said ringing current for a preselected interval of time, said time remaining fixed irrespective of the duration of individual bursts of said ringing current.

References Cited

UNITED STATES PATENTS

| | | |
|---|---|---|
| 3,239,610 | 3/1966 | Morse et al. |
| 3,283,083 | 11/1966 | MacLeod. |

WILLIAM C. COOPER, *Primary Examiner.*

W. H. HELVESTINE, *Assistant Examiner.*

U.S. Cl. X.R.

179—84